United States Patent
Zhao et al.

(10) Patent No.: US 12,344,796 B1
(45) Date of Patent: Jul. 1, 2025

(54) SUPERCRITICAL CO2 THICKENER FOR SHALE GAS RESERVOIR BASED ON HOLLOW MESOPOROUS SILICA NANOPARTICLES AND PREPARATION METHOD THEREOF

(71) Applicants: Southwest Petroleum University, Chengdu (CN); TIANFU YONGXING LABORATORY, Chengdu (CN)

(72) Inventors: Jinzhou Zhao, Chengdu (CN); Daijun Du, Chengdu (CN); Wanfen Pu, Chengdu (CN); Zezhou Fang, Chengdu (CN); Bo Zhou, Chengdu (CN); Chao Shen, Chengdu (CN); Zijia Liao, Chengdu (CN); Jintao Li, Chengdu (CN); Ying Xiong, Chengdu (CN); Rui Jiang, Chengdu (CN)

(73) Assignees: Southwest Petroleum University, Chengdu (CN); TIANFU YONGXING LABORATORY, Chengdu (CN)

( * ) Notice: Subject to any disclaimer, the term of this patent is extended or adjusted under 35 U.S.C. 154(b) by 0 days.

(21) Appl. No.: 19/185,160

(22) Filed: Apr. 21, 2025

(30) Foreign Application Priority Data

Jan. 20, 2025 (CN) .......................... 202510080838.4

(51) Int. Cl.
*C09K 8/594* (2006.01)

(52) U.S. Cl.
CPC .......... *C09K 8/594* (2013.01); *C09K 2208/10* (2013.01)

(58) Field of Classification Search
CPC ....................................................... C09K 8/06
See application file for complete search history.

(56) References Cited

U.S. PATENT DOCUMENTS

| | | | | |
|---|---|---|---|---|
| 10,479,926 B2 * | 11/2019 | Salla | ...................... | C09K 8/035 |
| 2016/0333260 A1 * | 11/2016 | Drake | ................... | E21B 43/267 |
| 2024/0010904 A1 | 1/2024 | Liu | | |

FOREIGN PATENT DOCUMENTS

| | | |
|---|---|---|
| CN | 103803565 B | 5/2014 |
| CN | 111057442 B | 4/2020 |
| CN | 116948178 A | 10/2023 |
| CN | 117801591 A | 4/2024 |
| CN | 118126260 B | 6/2024 |
| CN | 118462131 A | 8/2024 |
| CN | 119192470 B | 12/2024 |

OTHER PUBLICATIONS

FengXuefeng, Jin Weigen, Liu Fen, Luo Jianxun, "Advanceinpreparationofhollowmesopor oussilicaandsilica-basedmicrospheres" «Norganic Chemicals Industry» issue 12, Dec. 10, 2008 (Dec. 10, 2008), pp. 18-20.

Cunchuan Zheng, Preparation and Performance Offracturing Thickening Agent for Reservoir Stimulation of Shale Gas, Number of full dissertations in China According to the Catalogue (Engineering Science and Technology I), issue 5, May 15, 2020 (May 15, 2020), pp. B019-8.

Yang, Y etc. Increasing Volumetric CO2 Uptake of Hypercrosslinked Polymers through Composite Formation, «Macromolecular Materials and Engineering, vol. 304, p. 5.

Xiaohui W etc. Systematic Review of Solubility, Thickening Properties and Mechanisms of Thickener for Supercritical Carbon Dioxide, Nanomaterials, vol. 14, Jun. 7, 2024 (Jun. 7, 2024), p. 12.

* cited by examiner

*Primary Examiner* — William D Hutton, Jr.
*Assistant Examiner* — Avi T Skaist
(74) *Attorney, Agent, or Firm* — JEEN IP LAW, LLC

(57) ABSTRACT

The present invention discloses a supercritical CO2 thickener for shale gas reservoir based on hollow mesoporous silica nanoparticles and a preparation method thereof, and relates to the technical field of oil and gas field development. The preparation method of the thickener includes: reacting a monomer consisting of fluoroacrylate, styrene and vinyl acetate in a molar ratio of 3-5:1-2:1-2 with 2%-5% of a total weight of hollow mesoporous silica nanoparticles with carbon-carbon double bonds under the action of an initiator to obtain the thickener. The preparation method of the present invention does not involve the addition of organic solvents during the reaction process and thus does not cause harm to the human body. The thickener of the present invention has good CO2 viscosity-increasing effect and good sand carrying performance, and can effectively improve the fracturing effect.

5 Claims, No Drawings

SUPERCRITICAL CO2 THICKENER FOR SHALE GAS RESERVOIR BASED ON HOLLOW MESOPOROUS SILICA NANOPARTICLES AND PREPARATION METHOD THEREOF

CROSS-REFERENCE TO RELATED APPLICATIONS

This application claims priority to Chinese Patent Application No. 202510080838.4, filed on Jan. 20, 2025, which is hereby incorporated by reference in its entirety.

TECHNICAL FIELD

The present invention relates to the technical field of oil and gas field development, and particularly to a supercritical CO2 thickener for shale gas reservoir based on hollow mesoporous silica nanoparticles and a preparation method thereof.

BACKGROUND

Supercritical CO2 has high diffusivity similar to gas, high density and solubility of liquid, and also has the characteristics of low viscosity and low interfacial tension. Supercritical CO2 can reduce the fracture initiation pressure of shale, which is about 50% lower than water and about 15% lower than liquid CO2 under the same conditions, making it easier to form a complex fracture network; in addition, the supercritical CO2 not only has strong solvation capacity, which may dissolve some organic matter in a shale layer, increase porosity and improve permeability; but also has low seepage friction, which may achieve effective gas displacement of nanopores in the shale reservoirs. The competitive adsorption capacity and adsorption orderliness of CO2 in shale are much higher than those of CH4, and CO2 can efficiently replace the adsorbed CH4. Therefore, the shale gas reservoir is reformed by using supercritical CO2 instead of slickwater for fracturing, adsorbed gas is replaced (changed into free gas after replacement, and CO2 is absorbed and buried in situ), and the free gas is displaced by the unadsorbed CO2, so that the single-well yield and recovery rate of the shale gas may be improved synergistically. However, supercritical CO2 has a low viscosity, which is only 0.02 mPa·s to 0.16 mPa·s under construction. Therefore, supercritical CO2 is prone to settle during the sand carrying process in the wellbore and fractures, and the sand accumulates at the bottomhole or the root of the fracture, forming sand plug. Therefore, it is necessary to add a thickener to increase the viscosity of supercritical CO2.

The currently commonly used supercritical CO2 thickeners include siloxane polymers, hydrocarbon polymers, surfactants and fluorine-containing polymers. Polysiloxane derivatives have good thickening properties, but require the addition of co-solvents. Low-molecular-weight hydrocarbon polymers have poor thickening ability, and high-molecular-weight hydrocarbon polymers have poor solubility. The surfactant thickeners are used in large amounts and may only thicken supercritical CO2 3 to 5 times. Fluorinated polymers have the optimal thickening effect because of low cohesive energy, easy solubility in CO2, and a network structure with a thickening effect formed by cross-entwined molecular chains. However, perfluorinated compounds are toxic and cannot be metabolized by organisms after entering a water circulation system in the form of wastewater, causing varying degrees of damage. Therefore, it is necessary to prepare a novel supercritical CO2 thickener to solve the above defects. Nanomaterials have small-scale strong interface effects and extremely large specific surface areas, and thus have the effects of high fluidity, reduced interfacial tension, and improved rock wettability in porous media. Hollow mesoporous silica nanomaterials also have properties such as adjustable pore size, low density and high permeability, and thus have great application prospects.

SUMMARY

To solve at least one of the above problems, the present invention provides a supercritical CO2 thickener for shale gas reservoir based on hollow mesoporous silica nanoparticles and a preparation method thereof.

A preparation method of a supercritical CO2 thickener for shale gas reservoir based on hollow mesoporous silica nanoparticles includes the following steps: reacting a monomer consisting of fluoroacrylate, styrene and vinyl acetate in a molar ratio of 3-5:1-2:1-2 with 2%-5% of a total weight of hollow mesoporous silica nanoparticles with carbon-carbon double bonds under the action of an initiator to obtain the thickener.

In one embodiment of the present invention, the initiator is one or a mixture of azobisisobutyronitrile and dicumyl peroxidethe, and a concentration of the initiator is 30-100 ppm.

In one embodiment of the present invention, the hollow mesoporous silica nanoparticles with carbon-carbon double bonds are obtained by grafting a monomer containing a carbon-carbon double bond onto the hollow mesoporous silica nanoparticles.

Further, the monomer containing the carbon-carbon double bond is a silane coupling agent containing a carbon-carbon double bond, and an amount of the silane coupling agent used is 15%-25% of a mass of the hollow mesoporous silica nanoparticles.

Further, the silane coupling agent is one of γ-methacryloxypropyltrimethoxysilane, vinyltriethoxysilane and vinyltrimethoxysilane.

Further, the method specifically includes the following steps: uniformly mixing fluoroacrylate, styrene, vinyl acetate and an initiator under the stirring condition, adding the hollow mesoporous silica nanoparticles with carbon-carbon double bonds, heating to 50-120° C., and keeping the temperature for 3-6 h.

In one embodiment of the present invention, the perfluoroacrylate is one of heptadecafluorodecyl acrylate, hexadecafuorononyl acrylate, heptadecafluoroundecyl acrylate and octadecafluorodecyl acrylate.

A supercritical CO2 thickener for shale gas reservoir based on hollow mesoporous silica nanoparticles is prepared by the method according to any one of the aspects, and has a good viscosity-increasing effect on supercritical carbon dioxide.

Compared with the prior art, the present invention has the following beneficial effects: The preparation method of the present invention does not involve the addition of organic solvents during the reaction process and does not cause harm to the human body. The thickener of the present invention has a good CO2 viscosity-increasing effect and good sand carrying performance, and can effectively improve the fracturing effect. Meanwhile, low-density hollow mesoporous silica nanoparticles are used in the thickener of the present invention, and the uniformity of a fracturing system is improved after the thickening agent is added into fracturing fluid prepared from supercritical CO2. In addition, the thickener of the present invention is nano-grade and has little damage to shale reservoirs.

DESCRIPTION OF EMBODIMENTS

The present invention is further described in detail below with reference to the examples; however, the embodiments of the present invention are not limited thereto.

In the following examples, the articles are conventional commercial articles in the art unless otherwise specified.

In the following examples, the operations are conventional operations in the art unless otherwise specified.

In the following examples, hollow mesoporous silica nanoparticles with carbon-carbon double bonds were prepared by the following method:

150 mL of ethanol, 6.3 mL of ammonia water and 20 mL of deionized water were added to a beaker in sequence, and stirred at 25° C. for 1 h. The temperature was raised to 50° C., 12 mL of tetraethyl orthosilicate was added, and stirring was continued for 3 h. The reaction solution was centrifuged and washed with ethanol to obtain silica nanospheres.

400 mg of silica nanospheres were weighed and dispersed in 60 mL of ethanol/deionized water with a volume ratio of 1:2. 600 mg of cetyltrimethylammonium bromide was weighed and dissolved in 60 mL of ethanol/deionized water with a volume ratio of 1:2. The cetyltrimethylammonium bromide solution was then added to the silica nanosphere dispersion. After stirring for 30 min, 1 mL of tetraethyl orthosilicate and 2.4 mL of ammonia water were added in sequence, and stirring was continued for 12 h. The reaction solution was then centrifuged, and the centrifuged product was dispersed in 80 mL of deionized water. 40 mL of the dispersion was taken, 930 mg of anhydrous sodium carbonate was added to the dispersion, and then the dispersion was stirred at 50° C. for 11 h. After stirring, the dispersion was centrifuged, washed alternately with deionized water and ethanol 3 times, and dried at 50° C. for 24 h. The dried product was then calcined in a muffle furnace at 550° C. for 6 h to obtain hollow mesoporous silica nanospheres.

3 g of the hollow mesoporous silica nanospheres were weighed ultrasonically and dispersed into 200 mL of anhydrous ethanol/deionized water mixed solution with a pH of 4 and a volume ratio of 3:1. 0.6 g of γ-methacryloxypropyltrimethoxysilane was then added dropwise, and the temperature was then raised to 70° C. for reaction for 2 h. After centrifugation, the mixture was washed 3 times with anhydrous ethanol and dried at 60° C. for 12 h to obtain the hollow mesoporous silica nanoparticles with carbon-carbon double bonds.

Example 1

155.4 g (0.3 mol) of heptadecafluorodecyl acrylate, 10.4 g (0.1 mol) of styrene, 7.2 g (0.1 mol) of vinyl acetate and 40 ppm of azobisisobutyronitrile were uniformly mixed under the stirring condition, and then 3.5 g of the hollow mesoporous silica nanoparticles with carbon-carbon double bonds were added. After stirring uniformly, the temperature was raised to 60° C. and this temperature was kept for 4 h to obtain a viscous product, namely a target product.

Example 2

259 g (0.5 mol) of heptadecafluorodecyl acrylate, 10.4 g (0.1 mol) of styrene, 7.2 g (0.1 mol) of vinyl acetate and 40 ppm of azobisisobutyronitrile were uniformly mixed under the stirring condition, and then 5.5 g of the hollow mesoporous silica nanoparticles with carbon-carbon double bonds were added. After stirring uniformly, the temperature was raised to 60° C. and this temperature was kept for 4 h to obtain a viscous product, namely a target product.

Example 3

155.4 g (0.3 mol) of heptadecafluorodecyl acrylate, 20.8 g (0.1 mol) of styrene, 7.2 g (0.2 mol) of vinyl acetate and 40 ppm of azobisisobutyronitrile were uniformly mixed under the stirring condition, and then 3.7 g of the hollow mesoporous silica nanoparticles with carbon-carbon double bonds were added. After stirring uniformly, the temperature was raised to 60° C. and this temperature was kept for 4 h to obtain a viscous product, namely a target product.

Example 4

155.4 g (0.3 mol) of heptadecafluorodecyl acrylate, 10.4 g (0.1 mol) of styrene, 14.4 g (0.2 mol) of vinyl acetate and 40 ppm of azobisisobutyronitrile were uniformly mixed under the stirring condition, and then 3.6 g of the hollow mesoporous silica nanoparticles with carbon-carbon double bonds were added. After stirring uniformly, the temperature was raised to 60° C. and this temperature was kept for 4 h to obtain a viscous product, namely a target product.

Example 5

155.4 g (0.3 mol) of heptadecafluorodecyl acrylate, 10.4 g (0.1 mol) of styrene, 14.4 g (0.2 mol) of vinyl acetate and 40 ppm of dicumyl peroxide were uniformly mixed under the stirring condition, and then 3.6 g of the hollow mesoporous silica nanoparticles with carbon-carbon double bonds were added. After stirring uniformly, the temperature was raised to 110° C. and this temperature was kept for 4 h to obtain a viscous product, namely a target product.

Comparative Example 1

This comparative example is different from Example 1 in that the hollow mesoporous silica nanoparticles with carbon-carbon double bonds are not added, and the other experimental conditions are the same.

Comparative Example 2

This comparative example is different from Example 1 in that the added nano material is unmodified nano silicon dioxide.

To further illustrate the effect of the supercritical CO2 thickener for shale gas reservoir based on hollow mesoporous silica nanoparticles prepared in examples of the present invention, the thickeners are tested as follows.

The supercritical CO2 fracturing fluid with the mass concentration of 5% was prepared by using the thickeners prepared by Examples 1-5 and the thickeners prepared by Comparative Examples 1-2, the dissolution pressure of the thickeners and the viscosity of the fracturing fluid at 40° C. were measured by a high-temperature high-pressure visual dissolution kettle and an JS-ND rotational viscometer, and the final results are shown in Table 1.

TABLE 1

| | Solubility and viscosity of thickeners | |
|---|---|---|
| No. | Dissolution pressure (MPa) | Viscosity (mPa · s) |
| Example 1 | 8.1 | 6.9 |
| Example 2 | 8.1 | 7.2 |
| Example 3 | 8.4 | 7.4 |
| Example 4 | 7.9 | 7.1 |
| Example 5 | 8.1 | 7.1 |
| Comparative Example 1 | 8.8 | 4.9 |
| Comparative Example 2 | 8.6 | 5.4 |

It may be seen from Table 1 that the supercritical CO2 thickener for shale gas reservoir based on hollow mesoporous silica nanoparticles prepared by examples of the present invention has high thickening performance on supercritical carbon dioxide. Meanwhile, referring to Comparative Examples 1 and 2, it may be known that not only the dissolution pressure of the thickener product is reduced, but also the viscosity of the supercritical carbon dioxide can be increased after the hollow mesoporous silica nanoparticles are added, which indicates that the hollow mesoporous silica nanoparticles play a more critical role in the thickeners prepared by the examples of the present invention.

The above descriptions are merely preferred specific embodiments of the present invention, however, the protection scope of the present invention is not limited thereto, and any modifications and substitutions that can be easily conceived by those skilled in the art within the technical scope disclosed by the present invention shall fall within the protection scope of the present invention.

What is claimed is:

1. A preparation method of a supercritical $CO_2$ thickener for a shale gas reservoir based on hollow mesoporous silica nanoparticles, comprising the following steps: reacting a monomer consisting of fluoroacrylate, styrene and vinyl acetate in a molar ratio of 3-5:1-2:1-2 with 2%-5% of a total weight of hollow mesoporous silica nanoparticles with carbon-carbon double bonds under the action of an initiator to obtain the thickener, wherein the hollow mesoporous silica nanoparticles with carbon-carbon double bonds are obtained by grafting a monomer containing a carbon-carbon double bond onto the hollow mesoporous silica nanoparticles, wherein the monomer containing the carbon-carbon double bond is a silane coupling agent containing a carbon-carbon double bond, wherein an amount of the silane coupling agent used is 15%-25% of a mass of the hollow mesoporous silica nanoparticles, and wherein the silane coupling agent is one of γ-methacryloxypropyltrimethoxysilane, vinyltriethoxysilane and vinyltrimethoxysilane.

2. The method according to claim 1, wherein the initiator is one or a mixture of azobisisobutyronitrile and dicumyl peroxidethe, and a concentration of the initiator is 30-100 ppm.

3. The method according to claim 2, wherein the method specifically comprises the following steps: uniformly mixing fluoroacrylate, styrene, vinyl acetate and an initiator under the stirring condition, adding the hollow mesoporous silica nanoparticles with carbon-carbon double bonds, heating to 50-120° C., and keeping the temperature for 3-6 h.

4. The method according to claim 1, wherein the perfluoroacrylate is one of heptadecafluorodecyl acrylate, hexadecafuorononyl acrylate, heptadecafluoroundecyl acrylate and octadecafluorodecyl acrylate.

5. A supercritical CO2 thickener for shale gas reservoir based on hollow mesoporous silica nanoparticles prepared by the method according to claim 1.

* * * * *